US006612926B1

(12) United States Patent
Dabrowski

(10) Patent No.: US 6,612,926 B1
(45) Date of Patent: Sep. 2, 2003

(54) METHOD AND APPARATUS FOR CONCURRENT DISPLAY OF CARDS IN A PLAYING HAND AND CARDS ISSUED IN PREVIOUS PLAYING HANDS

(76) Inventor: Stanley P. Dabrowski, 2801 Deep Water Cir., Las Vegas, NV (US) 89117

( * ) Notice: Subject to any disclaimer, the term of this patent is extended or adjusted under 35 U.S.C. 154(b) by 0 days.

(21) Appl. No.: 09/489,911

(22) Filed: Jan. 24, 2000

(51) Int. Cl.[7] .............................. A63F 13/00; A63F 1/00

(52) U.S. Cl. .............................. 463/13; 463/11; 463/16; 273/292

(58) Field of Search .............................. 463/11, 12, 13, 463/16, 20, 25, 17, 18, 19, 21, 30, 31; 273/292, 138.1, 142 R, 143 R, 142 B, 138.2

(56) References Cited

U.S. PATENT DOCUMENTS 4,744,098 A * 5/1988 Grabowski .............. 273/148 R
5,531,440 A 7/1996 Dabrowski et al.
5,531,441 A 7/1996 Dabrowski et al.
5,536,140 A 7/1996 Wagner et al.
5,718,631 A * 2/1998 Invencion .................... 463/19
5,988,499 A * 11/1999 Sisca .......................... 273/309
6,217,447 B1 * 4/2001 Loflink et al. ................ 463/12
6,257,979 B1 * 7/2001 Walker et al. ................ 463/13
6,283,856 B1 * 9/2001 Mothwurf .................... 463/17

* cited by examiner

*Primary Examiner*—Jessica Harrison
(74) *Attorney, Agent, or Firm*—Gates & Cooper LLP

(57) ABSTRACT

A method, apparatus, article of manufacture, and a memory structure for concurrently presenting a current playing hand and cards issued in previous playing hand is disclosed. The method comprises the steps of presenting a playing hand having at least one card and a representation of at least one card issued in at least one previous game to a player; determining an outcome of the game; and taking an action according to an outcome of the game. The article of manufacture comprises a program storage device tangibly embodying instructions for performing the method steps described above. The apparatus comprises a processor, communicatively coupled to a display and a user input device, and a memory, coupled to the processor, the memory storing instructions for concurrently displaying a playing hand having at least one card and a representation of at least one card issued in a previous hand.

21 Claims, 11 Drawing Sheets

METHOD AND APPARATUS FOR CONCURRENT DISPLAY OF CARDS IN A PLAYING HAND AND CARDS ISSUED IN PREVIOUS PLAYING HANDS

BACKGROUND OF THE INVENTION

1. Field of the Invention

The present invention relates to systems and methods for playing games, and in particular, to a system and method for concurrently displaying a current playing hand and cards issued in the playing hands of one or more previous games.

2. Description of the Related Art

Video-based games of chance have enjoyed widespread popularity. These games, which include video poker and video blackjack, can be played according to a virtually endless variety of rules.

In a typical draw poker game, the player is issued a playing hand of five cards. The player then selects a number of cards as "held" cards. Cards not selected as "held" cards are discarded, and newly issued cards take their place. The player's hand is then evaluated to determine if it includes a winning hand.

In most cases, the deck from which the playing cards are obtained (typically, an electronic "deck") is "shuffled" before each game is played, and hence, the cards issued in a previous hand provide little or no information regarding the probability of any particular card being issued in the next succeeding game. Nonetheless, many players, even those who are aware of the statistical independence of the cards issued in successive games, regard information regarding previous games as a useful indicator of the probability of the identity of the cards issued in the current game. It is also true that virtually all random number generators do not produce truly random numbers. Rather, they produce numbers that appear to be random. In fact, in some cases, data from random number generators manifest characteristics similar to fractals, indicating that such numbers are not truly random. What is needed is a system that allows the player to make this judgment for themselves, and to consider the playing cards issued in previous games when determining which cards to "hold" and which to "draw." The present invention satisfies that need.

SUMMARY OF THE INVENTION

To address the requirements described above, the present invention discloses a method, apparatus, article of manufacture for concurrently presenting a current playing hand and cards issued in previous playing hands.

The method comprises the steps of presenting a playing hand having at least one card and a representation of at least one card issued in at least one previous game to a player; determining an outcome of the game; and taking an action according to an outcome of the game. The article of manufacture comprises a program storage device tangibly embodying instructions for performing the method steps described above.

The apparatus comprises a processor, communicatively coupled to a display and a user input device, and a memory, coupled to the processor, the memory storing instructions for concurrently displaying a playing hand having at least one card and a representation of at least one card issued in a previous hand.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
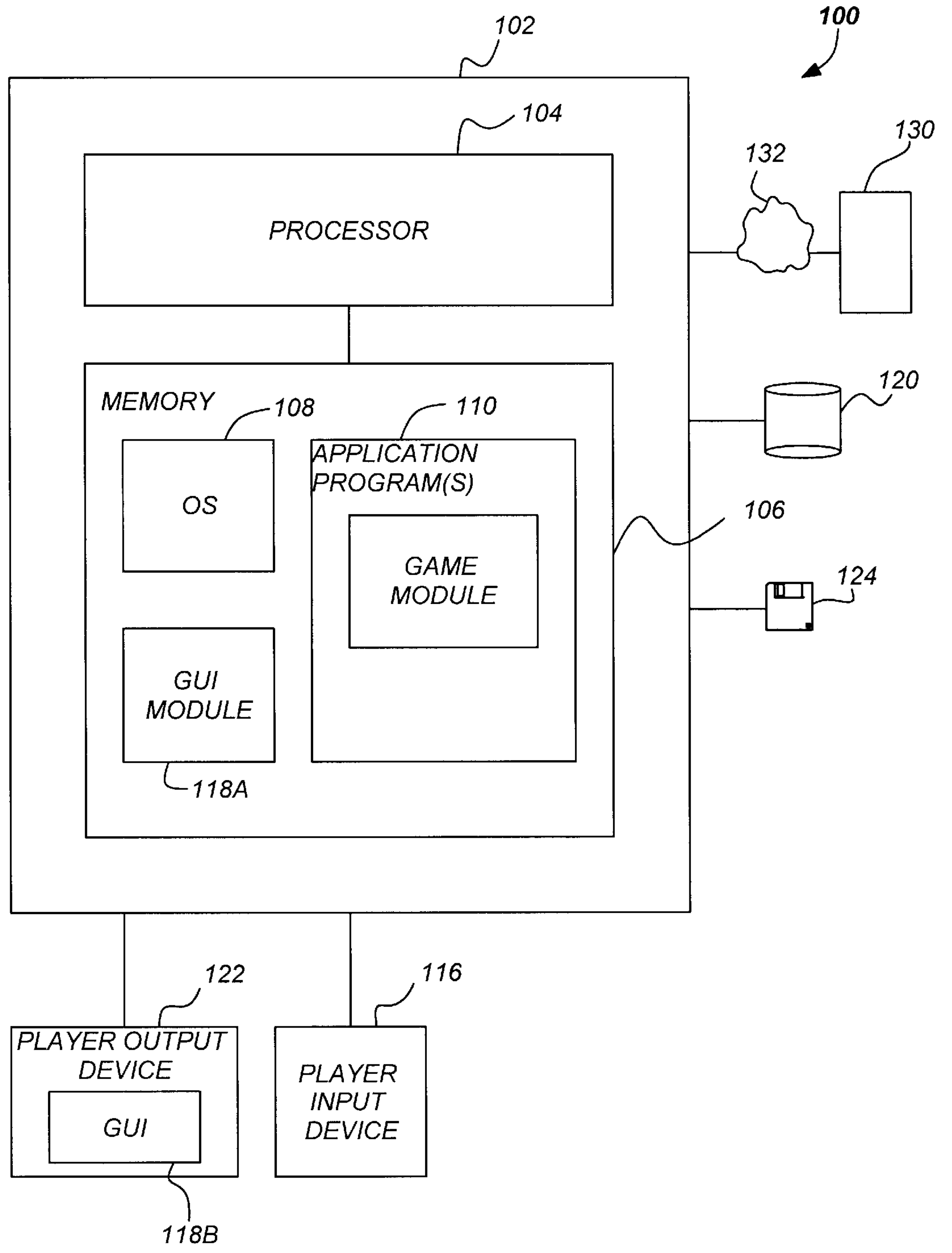
FIG. 1 is a diagram showing an exemplary hardware environment for practicing the present invention.

FIG. 1 illustrates an exemplary gaming system 100 that could be used to implement the present invention. The gaming system 100 comprises a computer 102 or similar device comprising a processor 104 and a memory, such as random access memory (RAM) 106. The computer 102 is operatively coupled to a player output device or display 122, which presents images such as windows to the user on a graphical user interface 118B. The computer 102 is also coupled to a player input device 116, which may comprise an array of buttons, a slot machine handle (in embodiments in which the game provides slot machine functionality), a keyboard, or a mouse. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. One or more application programs can be stored in the memory 106. Such application(s) 110 access and manipulate data stored in the memory 106 of the computer 102 using the relationships, instructions and logic described in the application code stored in the memory 106. The computer 102 can also be communicatively coupled to other computers 130 in a virtual private network (VPN), local area network (LAN) or wide area network (WAN) or the Internet 132 via a wide variety of external communication devices such as modems, satellite links, an Ethernet card or similar devices, thus permitting the computer to share data with other devices, and to accept or issue commands to such devices as well.

In one embodiment, instructions implementing the operating system 108, and/or the computer program(s) 110 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture," "program storage device," and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2:
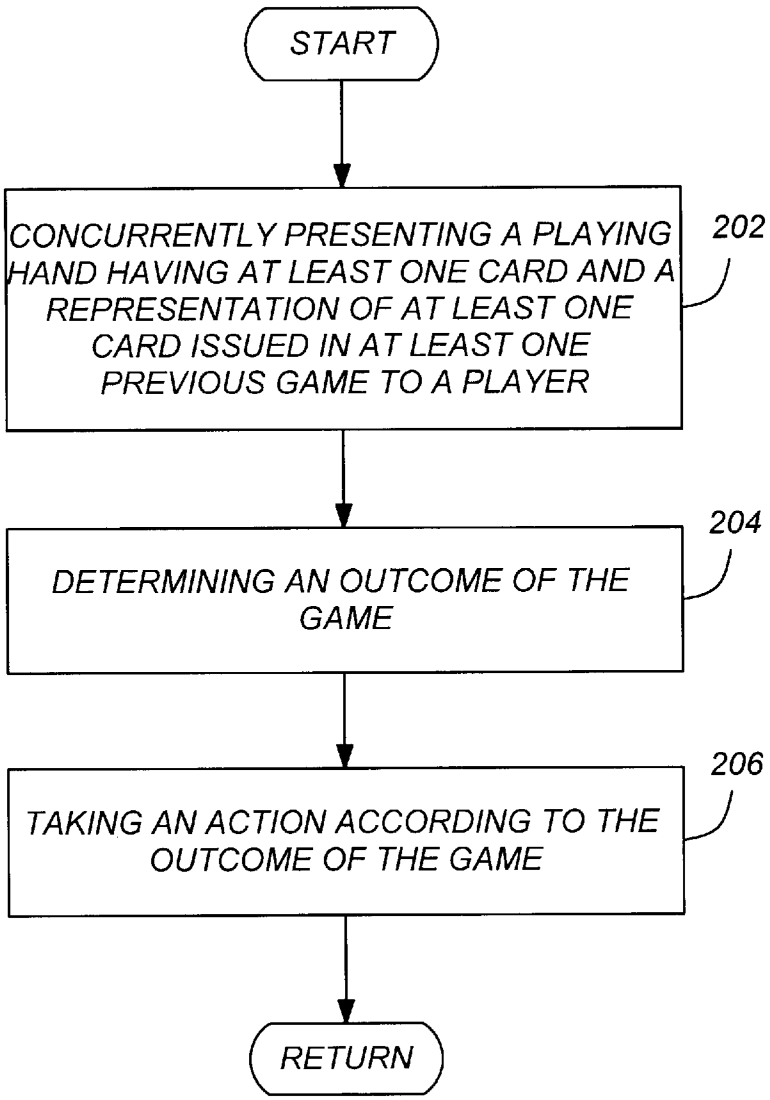
FIG. 2 is a flow chart presenting an illustrative example of process steps used in practicing the present invention.

FIG. 2 is a flow chart showing the operations used to practice one embodiment of the present invention. A playing hand is presented to the player as shown in block 202. The playing hand comprises at least one playing card. Concurrently, at least one card issued in at least one previous game is also presented to the player. The outcome of the game is determined, as shown in block 204. In one embodiment of the present invention, the outcome of the game is determined based upon further input (i.e. manipulation of the player input device 116). For example, the present invention can be manifested in a video draw poker game in which the user selects one or more of the cards of the playing hand to be held, and then selects a draw function so that additional cards can be obtained. Also, the present invention can be manifested in a video blackjack game in which further player input is required to determine whether the player wishes to stand or draw additional cards. At the same time, the present invention may be manifested in a game of chance wherein no further player interaction is required, as is the case, for example in a slot machine or similar device.

FIGS. 3A–3I are diagrams illustrating an application of the present invention to a video draw poker game.

Figure 3A:
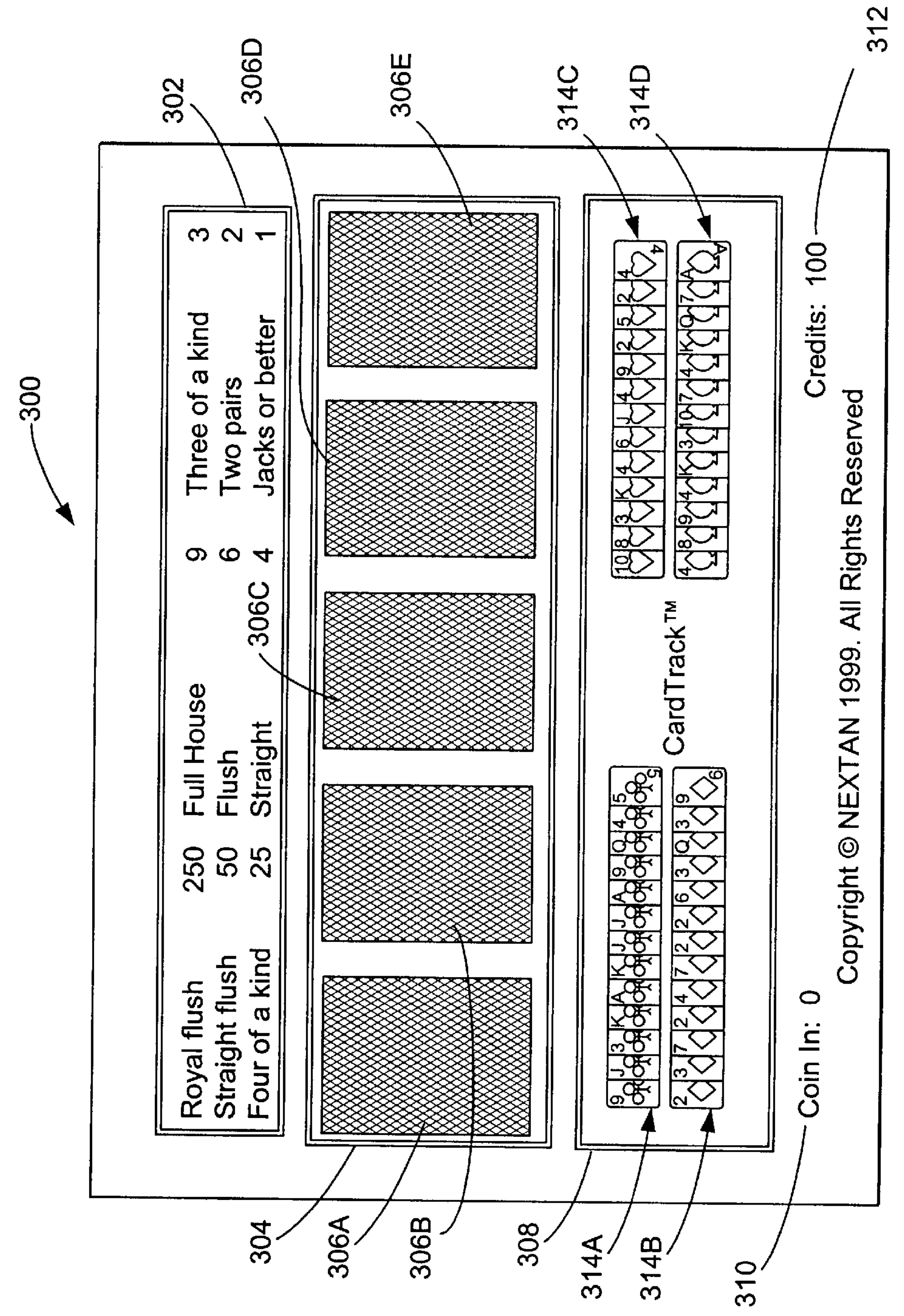
FIGS. 3A–3I are diagrams showing an illustration of game play using the present invention.

FIG. 3A is a depiction of a display image 300 presented on the player output device 122 in one embodiment of the present invention. The image comprises a first region 302, a second region 304, and a third region 308. The first region 302 presents information regarding the payout for different playing hand outcomes. For example, if the player obtains a Royal Flush, the gaming system 100 in the illustrated embodiment will pay the player 250 coins (or other monetary units) for each coin (or monetary unit) that is wagered. The odds presented in the first region may change as additional coins are inserted. For example, if two monetary units are wagered, the payout schedule may change so that a Royal Flush payout increases to 300 monetary units instead of 250. Also, it is envisioned that the payouts for the various outcomes presented in the first region can be changed so that the expected value of each wager is the same, but becomes more (or less) heavily weighted to certain payouts. For example, the player can be rewarded with a better payout for lower ranked hands (e.g. three of a kind, two pair, or a pair of Jacks or better). Or, the player may be presented with winning combinations that are unavailable with a wager of a single monetary unit. For example, if the user wagers 5 monetary units or more, the payout schedule can be adjusted so that the player receives all or part of their wager in return for obtaining at least one pair.

The image also comprises a second region 304 in which the playing hand is displayed. The second region 304 comprises one or more card positions 306A–306E, in which issued cards are presented to the player. A third region 308 is disposed adjacent the second region 304. The third region 308 displays cards issued in previous playing hands. In the embodiment illustrated in FIG. 3A, the cards displayed in the third region 308 are presented in groups 314A–314D according to suit, and are chronologically arranged, so that the most recently issued cards in each suit are on the right side of each group 314–314D of cards. In the illustrated embodiment, the player has not yet been issued the first cards of the first playing hand, yet, the playing cards issued to a previous player are shown. In another embodiment, playing cards are issued only for cards that each player has actually played. In this embodiment, the third region 308 would show no cards (since none have yet been issued to the player).

The image also comprises a wager indicator 310 which indicates the player's wager. In one embodiment, this is selected by repeatedly selecting a wager button in the player input device 116. Wagers can also be retained for each successive game until changed, if desired. Finally, the image also includes a credit indicator 312 which informs the user how many monetary unit credits are currently available for play. In the illustrated embodiment, the player has 100 units available.

Figure 3B:
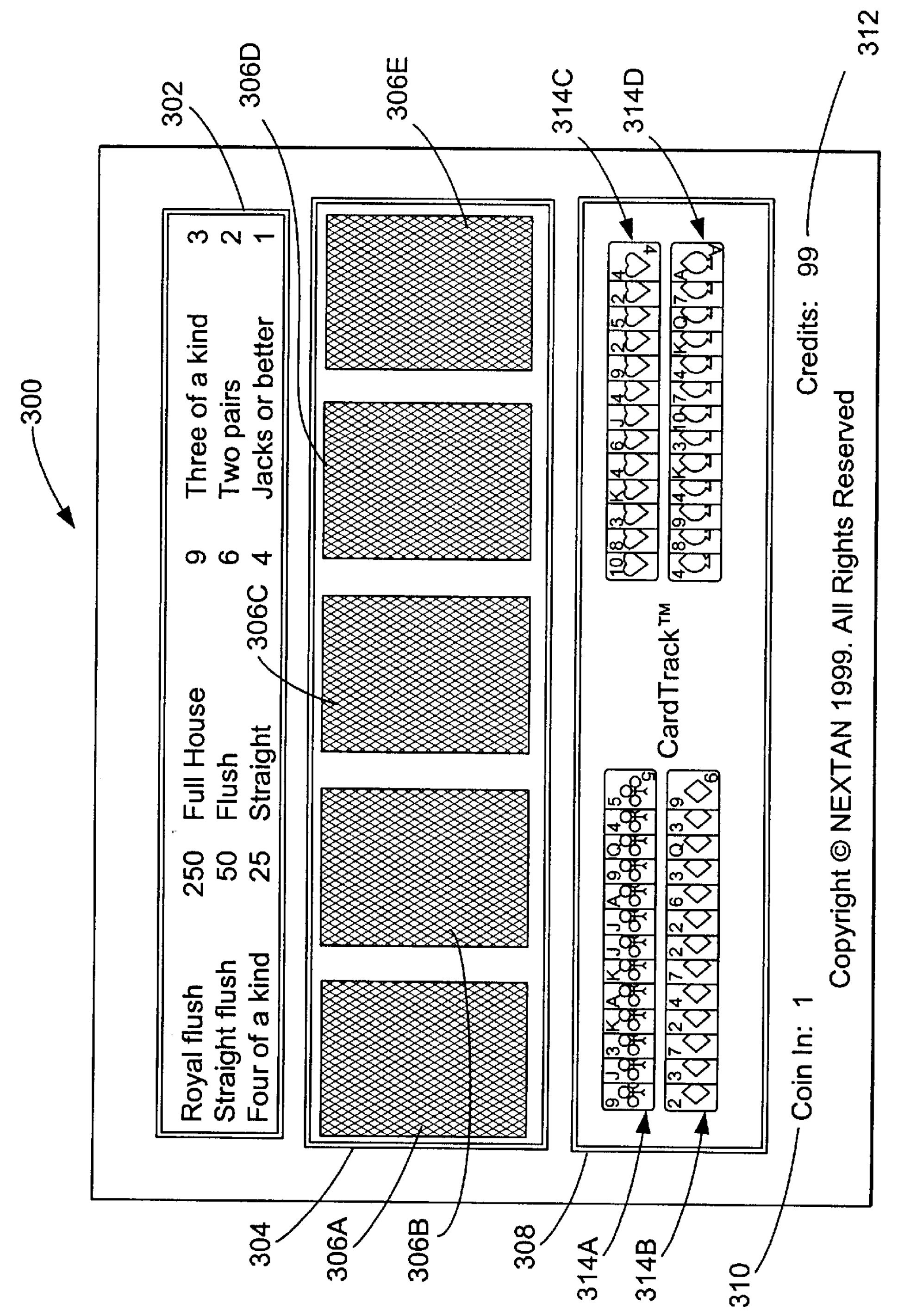

FIG. 3B is a diagram presenting an illustrative embodiment of the displayed image after the user has selected a wager of a single monetary unit. Thus, the wager indicator 310 has incremented by one monetary unit, and the credit indicator 312 has been decremented by one monetary unit as well. After the wager has been selected, the cards for the playing hand are issued to the player. This can be in response to the selection of a "draw" or "play" command on the player input interface 116, or automatically after the expiration of a particular interval of time after the wager is selected.

Figure 3C:
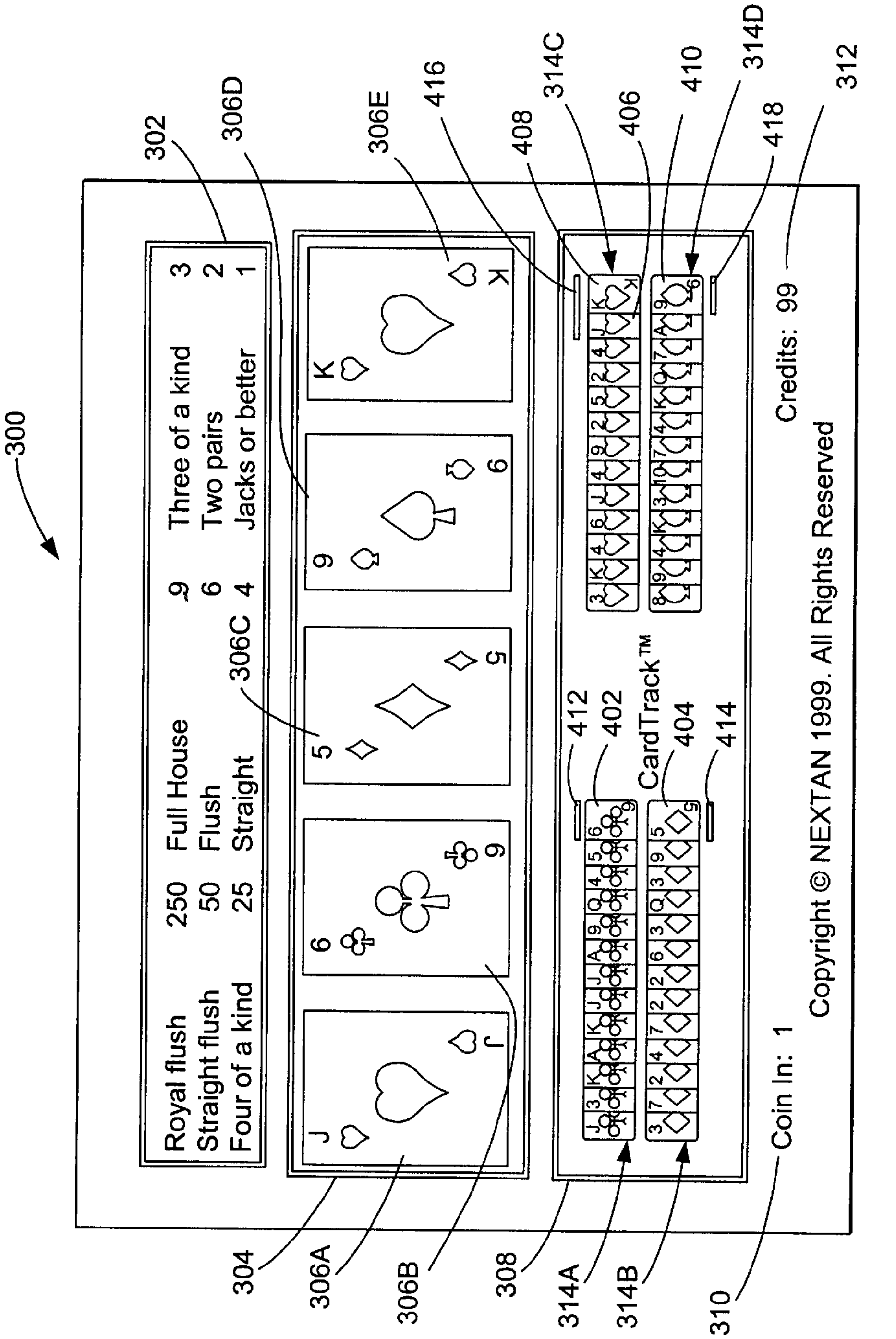

FIG. 3C is a diagram presenting an illustrative embodiment of the displayed image after the cards of the playing hand have been dealt. In the illustrated case, a Jack of hearts (J♥) was issued in the first card position 306A, a six of clubs (6♣) was issued in the second card position 306B, a five of diamonds (5♦) was issued in the third card position 306C, a nine of spades (9♠) was issued in the fourth card position 306D, and a King of hearts (K♥) was issued in the fifth card position 306E. At the same time, the third region 308 was updated, so that the cards described above (J♥, 6♣, 5♦, 9♠, and K♥) are concurrently displayed to the player.

In one embodiment, cards presented in the second region 304 are also displayed in the third region 308. The third region 308 of display image 300 can also be annotated with indicators such as indicators 412–418 to indicate which cards in the third region 308 have been issued in the current game. In the illustrated example, indicator 412 is placed adjacent to the 6♣ 402 to indicate that the 6♣ 402 was issued in the current game (it is also still displayed in the second region 304), indicator 414 is placed adjacent to the 5♦ 404 to indicate that the 5♦ 404 is in the current game, indicator 416 is placed adjacent to both the J♥ 406 and the K♥ 408 to indicate that that the J♥ 406 and the K♥ 408 have been played in the current game, and indicator 418 is placed adjacent to the 9♠ 410 to indicate that the 9♠ 410 has been played in the current game.

In another embodiment, the cards presented in the second region 304 are not presented in the third region 308 until they are no longer displayed in the second region 304. Hence, in this embodiment, no new cards will be displayed in the third region 308, and the indicators 412–418 need not be presented at this time.

After the image in FIG. 3C is presented, the player may select which cards are to be held, and which are to be discarded. In doing so, the player may wish to refer to the information presented in the second region 308. In most cases, the deck from which the playing cards are obtained (typically, an electronic "deck") is "shuffled" before each game is played, and hence, the cards issued in a previous hand provide little or no information regarding the probability of any particular card being issued in the next succeeding game. Nonetheless, many players, even those who are aware of the statistical independence of the cards issued in successive games, regard information regarding previous games as a useful indicator of the probability of the identity of the cards issued in the current game. It is also true that virtually all random number generators do not produce truly random numbers. Rather, they produce numbers that appear to be random. In fact, in some cases, data from random number generators manifest characteristics similar to fractals, indicating that such numbers are not truly random. The present invention allows the player to make this judgment for themselves, and to consider the playing cards issued in previous games when determining which cards to "hold" and which to "draw."

Of course, while in the foregoing example, this has been described with regard to a video poker game, the foregoing can be readily applied to any number of games of chance, including blackjack and slot machine. In particular, it is commonly believed that the probability of payout from any particular slot machine depends on its recent payout history (e.g. if there was a recent payout, there is a reduced probability of a payout in the near future).

Returning to the illustrative example of the play of a video draw poker game, the player may now choose to hold or draw any of the cards currently issued (J♥, 6♣, 5♦, 9♠, or K♥) via the player input device 116.

Figure 3D:
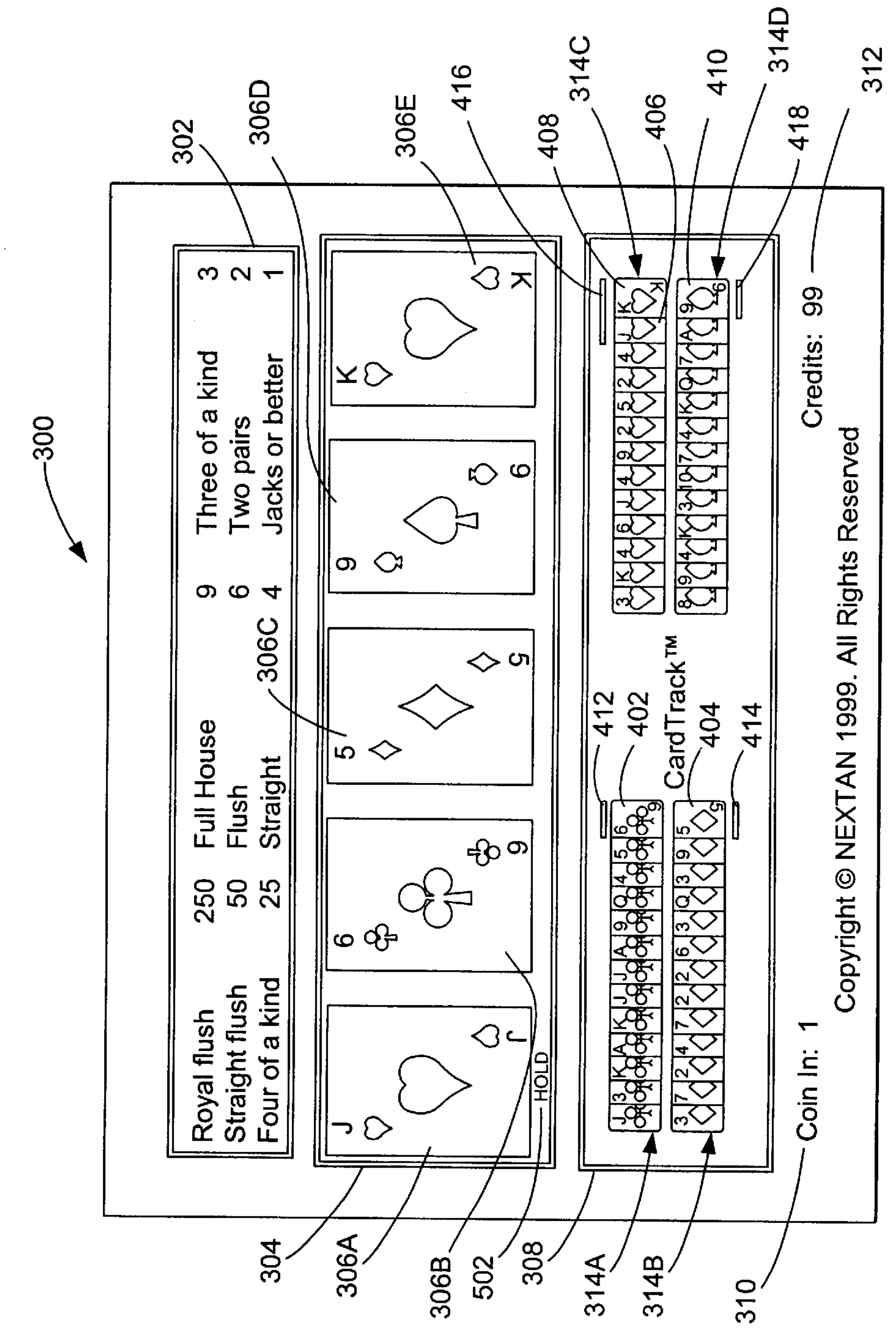

FIG. 3D is a diagram presenting an illustrative embodiment of the displayed image wherein the player has elected to hold the J♥ card. An annunciator 502 adjacent to the first card position 306A in the second region 304 is provided to indicate that the player has elected to "hold" this card. After this is accomplished, the player selects a "draw" button or other input on the player input device 116, and additional cards are drawn and presented in locations where "unheld" cards were earlier presented (in the illustrated example, positions 306B–306E).

Figure 3E:
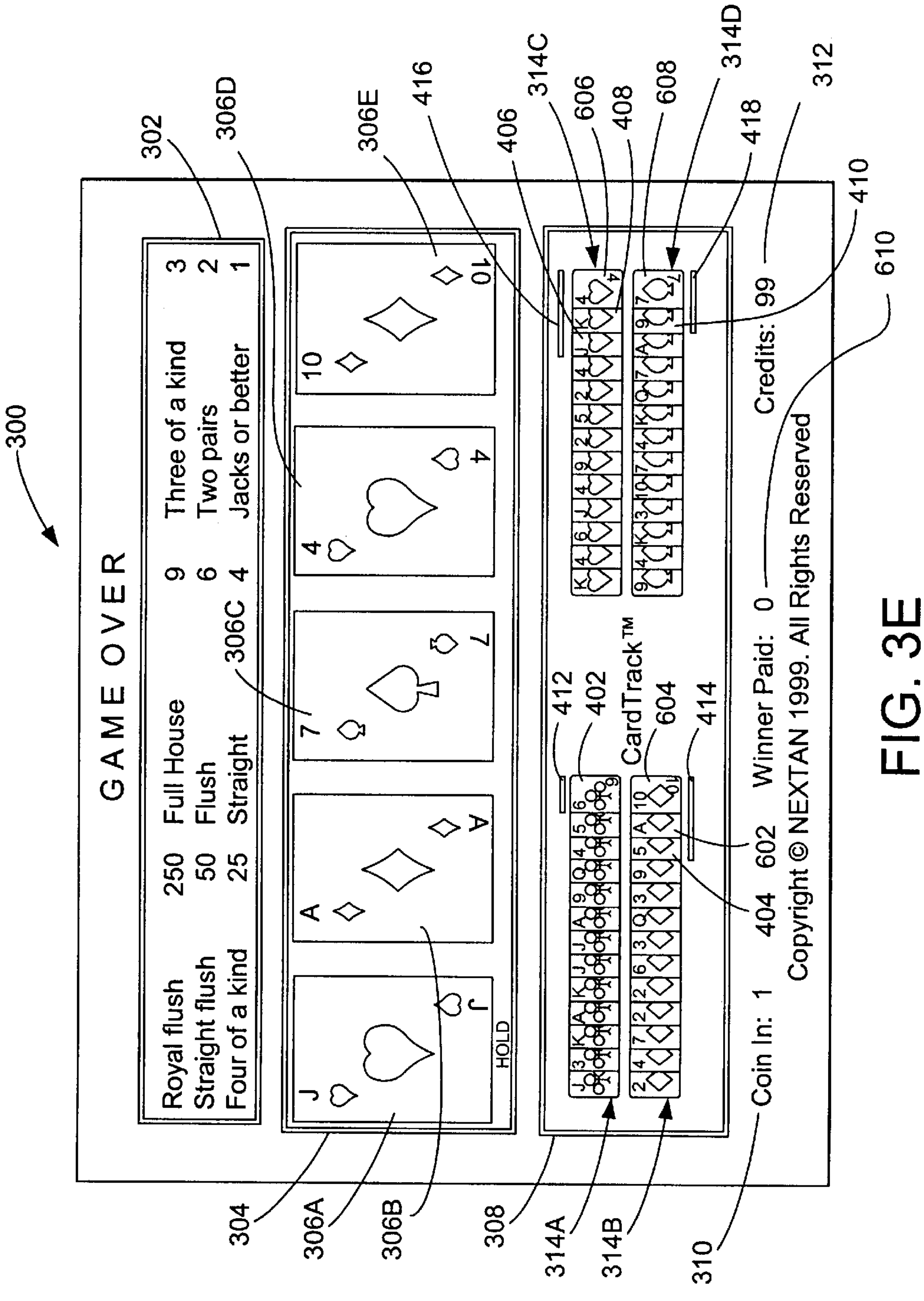

FIG. 3E is a diagram presenting an illustrative embodiment of the displayed image 300 after the player draws additional cards. In the illustrated embodiment, the player has drawn an Ace of diamonds (A♦), a seven of spades (7♠), a four of hearts (4♥), and a ten of diamonds (10♦). These cards are displayed in the second region 304 as a part of the playing hand, and are also displayed in the third region 308. In one embodiment, the cards presented in the third region 308 are ordered by suit and chronological order, hence, the new cards take the place of the originally issued cards at the right edge of each group 314A–314D. Accordingly, the representation of the 5♦ 404 is moved to the left and the representation of the A♦ 602 and 10♦ 604 are placed first (in the illustrated embodiment, the rightmost position). Similarly, the representation of the J♥ 406 and the K♥ 408 are shifted over to the left in group 314C, the representation of the 4♥ 606 assumes the status as the most chronologically recent card, and the representation of the 7♠ 608 takes the place as the most recent card in group 314. Further, indicators 412–418 are similarly modified to indicate all of the cards played in the current hand.

At this point, the player has drawn, and failed to obtain a winning playing hand. Hence, a winnings indicator 610 indicates that no monetary units have been paid out. At this point, the player can cash out, or play another game by suitable input to the player input device 116.

Figure 3F:
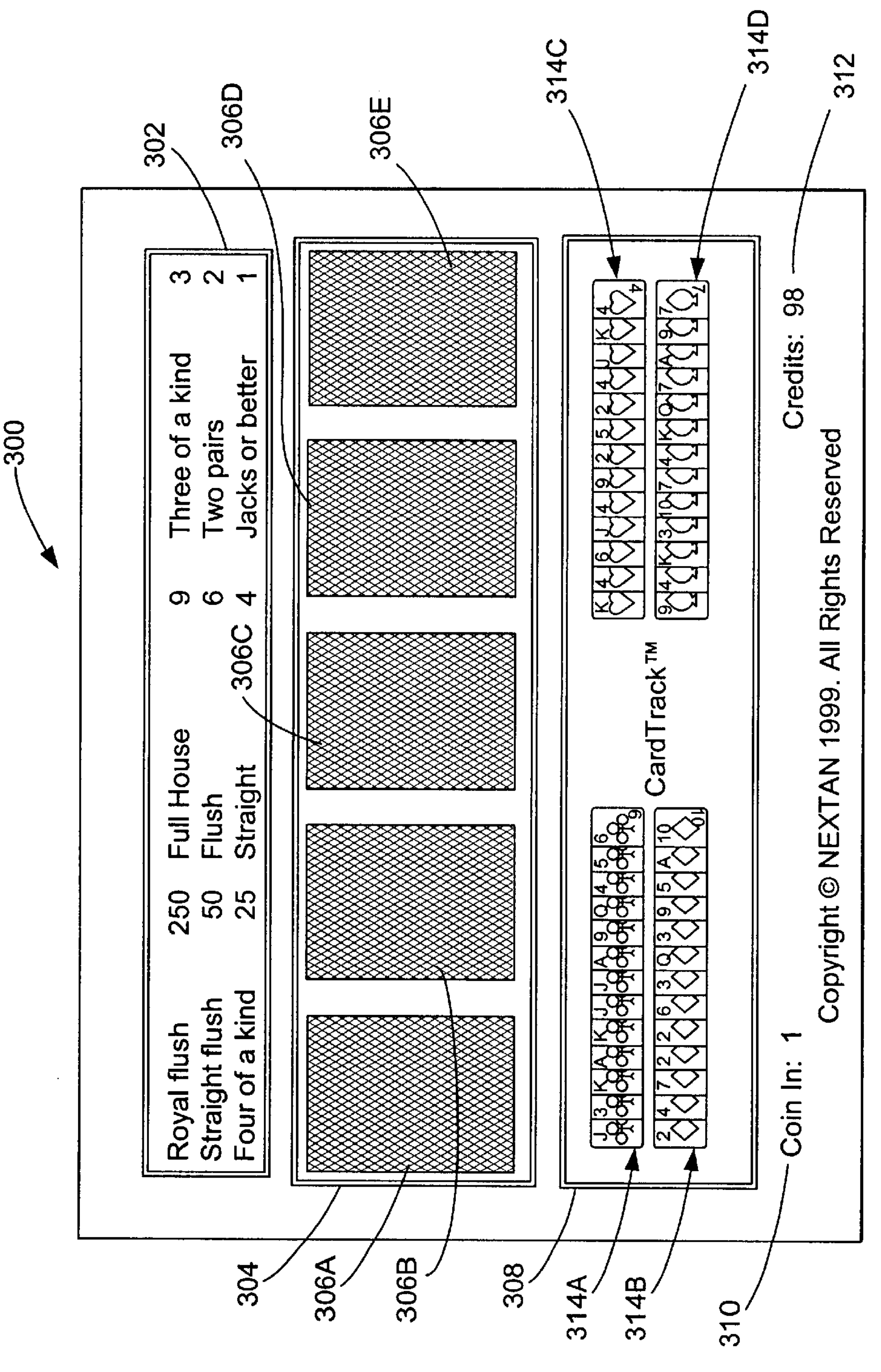

FIG. 3F is a diagram presenting an illustrative embodiment of the displayed image after the player has wagered another monetary unit. Note that the credit indicator 312 has been decremented, and the wager indicator 310 has been incremented by one monetary unit, and that the first region 302 indicates the payout for each winning hand for the wager selected. Note that representations for all of the cards issued in the previous game (J♥, A♦, 7♠, 4♥, 10♦, 6♣, 5♦, 9♠, and K♥), are displayed in the third region 308, but since none of these cards are in the current playing hand (at least not yet), no indicators (e.g. 412–418) are presented.

Figure 3G:
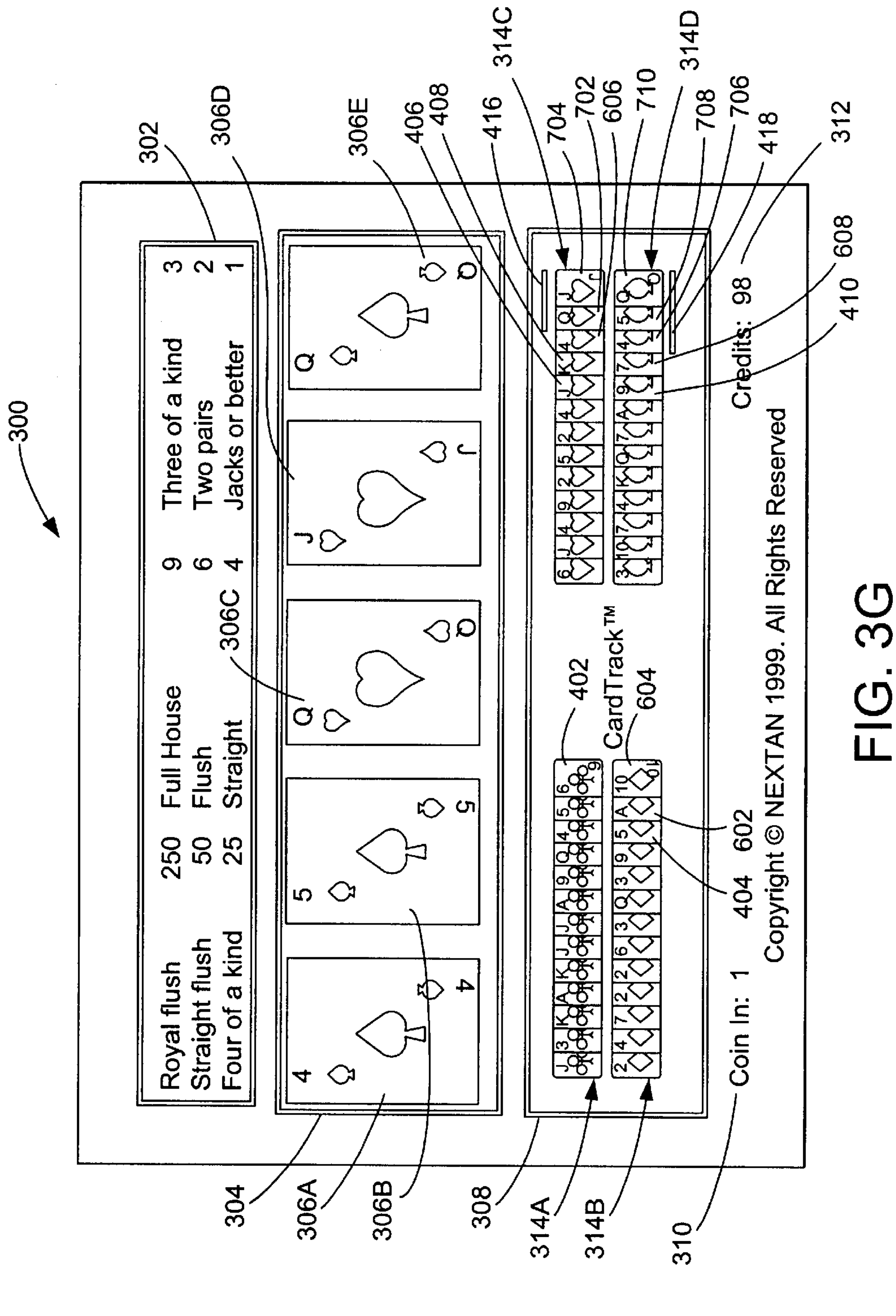

FIG. 3G is a diagram presenting an illustrative embodiment of the displayed image after the cards of a second playing hand have been dealt. Note that all of the cards issued in the previous game (J♥ 406, A♦ 602, 7♠ 608, 4♥ 606, 10♦ 604, 6♣ 402, 5♦ 404, 9♠ 410, and K♥ 408), as well as the newly dealt cards four cards, which include representations of the four of spades (4♠) 706, five of spades (5♠) 708, Queen of hearts (Q♥) 702, Jack of hearts (J♥) 704, and the Queen of spades (Q♥) 710, are displayed in the third region 308. Further note that indicators 416 and 418 indicate those cards played in the current game.

Figure 3H:
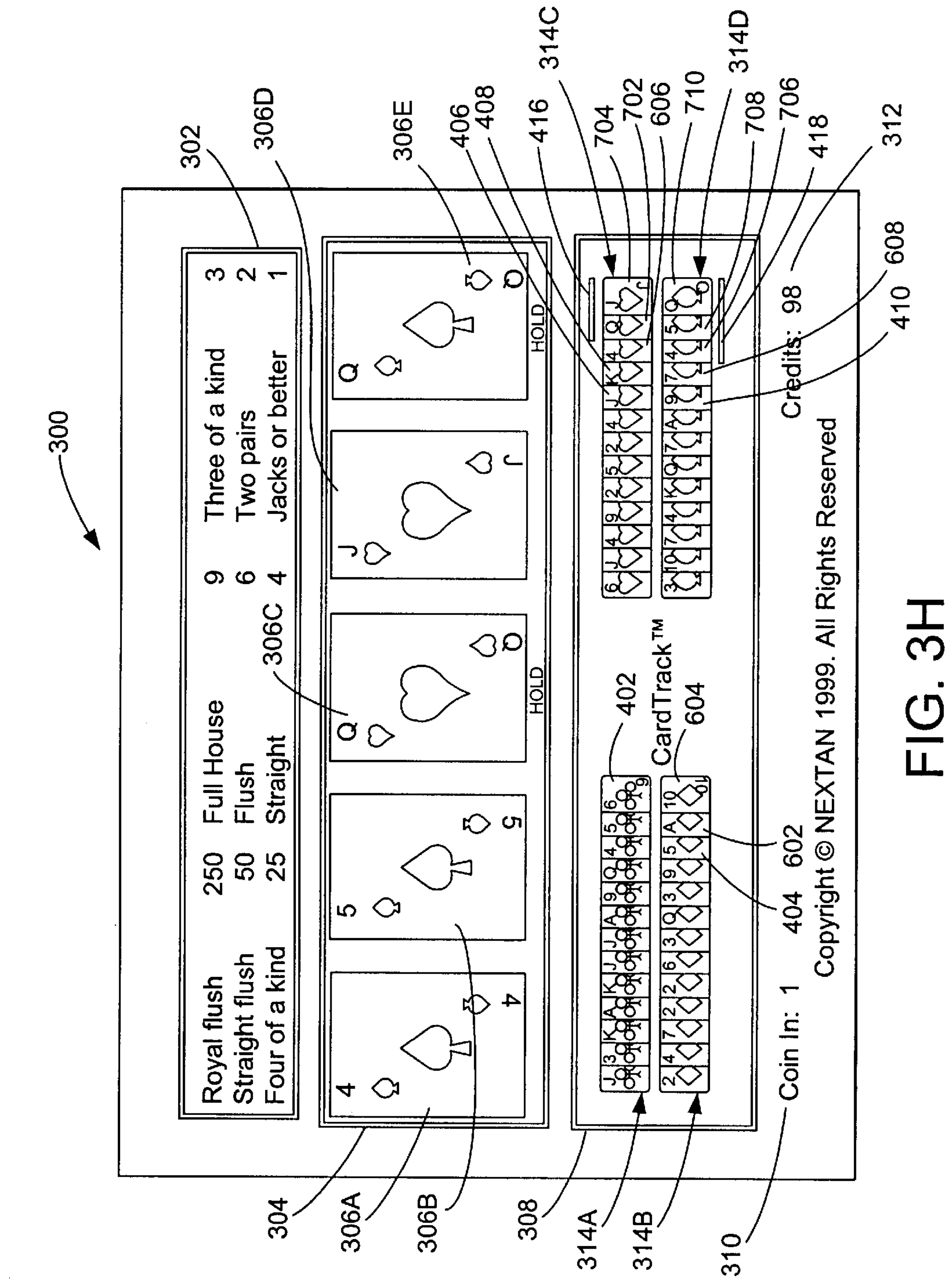

FIG. 3H is a diagram presenting an illustrative embodiment of the displayed image after the player has selected "held" cards. In the illustrated embodiment, the player has elected to hold both Queens, thus ensuring a payout of at least one monetary unit. After the cards are held, the player selects a "draw" function using the player input device 116. Additional cards are drawn to replace the cards that were not held (e.g., the 4♠, 5♠, and J♥).

Figure 3I:
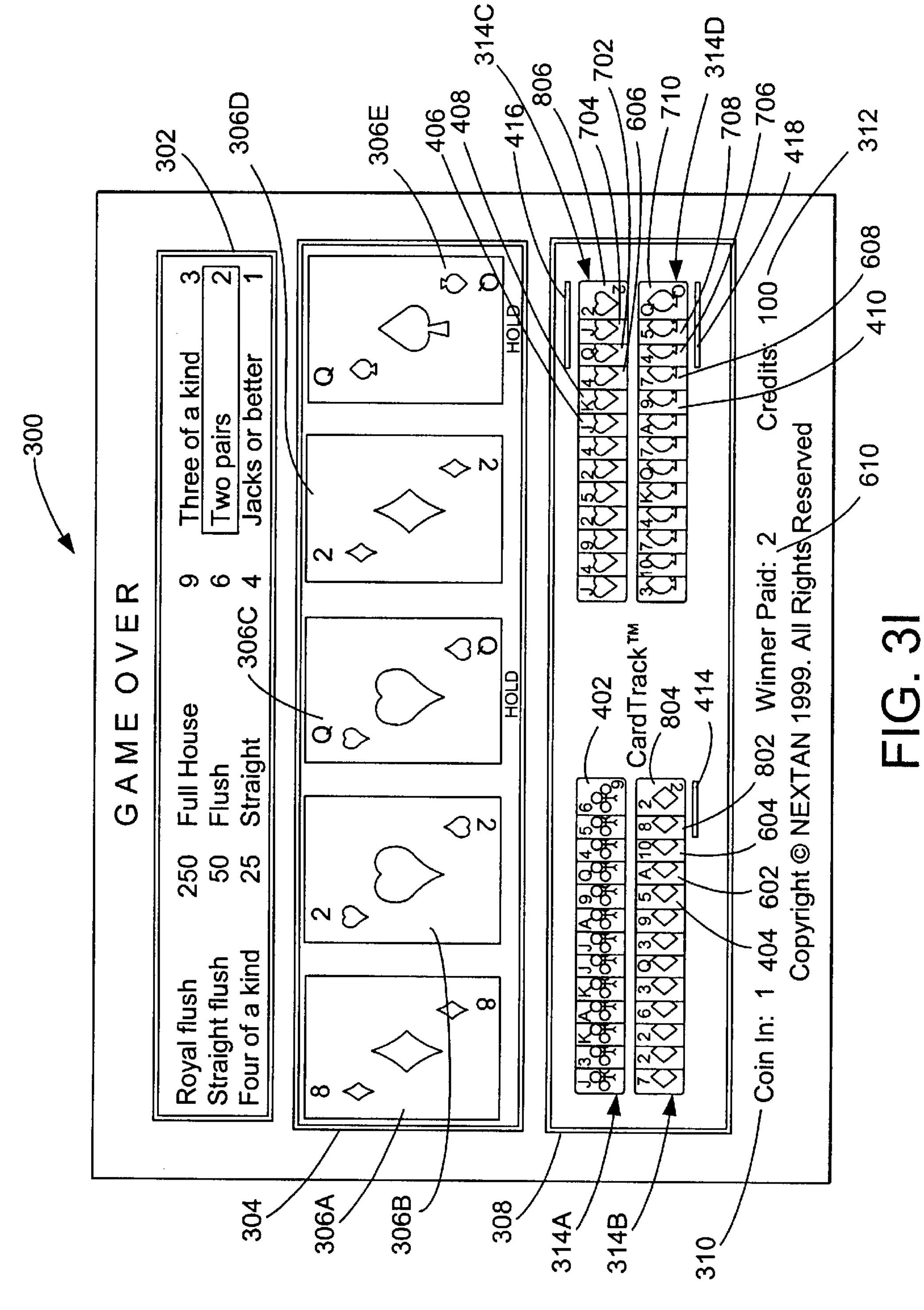

FIG. 3I is a diagram showing the new cards issued to replace the non-held cards. As shown in FIG. I, a representation of the drawn cards, including representations of the eight of diamonds (8♦) 802, the two of hearts (2♥) 806, and the two of diamonds (2♦) 804, are presented in the second region 304 and the third region 308. Similarly, the indicators 412–418 are modified to indicate all of the cards issued in the current game. Note that the player has drawn two pairs, indicating a winning of two monetary units, as indicated by the winnings indicator 610. Also note that the area near the text describing the winning hand is modified or highlighted with annunicator 302 to indicate which winning hand was obtained by the player. The foregoing method of play continues until the player exhausts the monetary credits, or elects to cash out.

CONCLUSION

This concludes the description of the preferred embodiments of the present invention. In summary, the present invention describes a method, and apparatus for concurrently presenting a current playing hand and cards issued in previous playing hand.

The method comprises the steps of presenting a playing hand having at least one card and a representation of at least one card issued in at least one previous game to a player; determining an outcome of the game; and taking an action according to an outcome of the game. The article of manufacture comprises a program storage device tangibly embodying instructions for performing the method steps described above.

The apparatus comprises a processor, communicatively coupled to a display and a user input device, and a memory, coupled to the processor, the memory storing instructions for concurrently displaying a playing had having at least one card and a representation of at least one card issued in a previous hand.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of playing a video poker game, comprising the steps of:

presenting a display to a player, the display comprising a playing hand of a video poker game comprising at least two dealt cards, and a representation of each card issued in one or more previous games;

accepting a player selection of held cards from the dealt cards;

drawing a substitute card for each card of the playing hand that is not selected as a held card;

presenting a representation of each card that is not a held on the display;

determining the outcome of the game; and taking an action according to the outcome of the game.

2. A method of playing a game, comprising the steps of:

concurrently presenting a playing hand having at least one card and a representation of each card issued in at least one previous game to a player;

determining an outcome of the game; and taking an action according to the outcome of the game.

3. The method of claim 2, wherein the step of concurrently presenting a playing hand having at least one card and a representation of each card issued in a previous game to the player comprises the step of:

chronologically arranging the each card issued in a previous game.

4. The method of claim 2, wherein the playing hand comprises a plurality of cards selected from a deck having a plurality of suits, and wherein the step of concurrently presenting a playing hand having at least one card and a representation of each card issued in a previous game to the player comprises the steps of:

grouping each card issued in the previous game by suit; and presenting the grouped cards issued in the previous game to the player.

5. The method of claim 4, wherein the step of concurrently presenting a playing hand having at least one card and a representation of each card issued in a previous game to the player comprises the step of:

chronologically arranging each card in each group of cards issued in a previous game.

6. The method of claim 2, wherein the step of concurrently presenting a playing hand having at least one card and a representation of at least one card issued in at least one previous game to the player comprises the step of:

concurrently presenting a playing hand having at least one card and a representation of at least one card issued in an immediately preceding game to the player.

7. The method of claim 2, wherein the step of concurrently presenting a playing hand having at least one card and a representation of at least one card issued in at least one previous game to the player further comprises the step of:

annotating the representation of each card to indicate the cards in the playing hand.

8. An apparatus for playing a game, comprising:

a processor communicatively coupled to a display and a user input device;

a memory, communicatively coupled to the processor, the memory storing instructions for concurrently presenting a playing hand having at least one card and a representation of each card issued in at least one previous game to the player.

9. The apparatus of claim 8, wherein the instructions for concurrently presenting a playing hand having at least one card and a representation of at least one card issued in at least one previous game to the player comprises the instructions for chronologically arranging each card issued in a previous game.

10. The apparatus of claim 8, wherein the playing hand comprises a plurality of cards selected from a deck having a plurality of suits, and wherein the instructions for concurrently presenting a playing hand having at least one card and a representation of at least one card issued in at least one previous game to the player comprise instructions for grouping each card issued in the previous game by suit, and presenting the grouped cards issued in the previous game to the player.

11. The apparatus of claim 10, wherein the instructions for concurrently presenting the playing hand having at least one card and a representation of each card issued in a previous game to the player comprises instructions for chronologically arranging each card in each group of cards issued in a previous game.

12. The apparatus of claim 8, wherein the instructions further comprise instructions for annotation the representation of each card to indicate the cards in the playing hand.

13. An article of manufacture embodying logic for playing a game in a computer system, comprising:

concurrently presenting a playing hand having at least one card and a representation of each card issued in at least one previous game to a player;

determining an outcome of the game; and taking an action according to the outcome of the game.

14. An apparatus for playing a game, comprising:

a display for concurrently presenting a playing hand having at least one card and a representation of each card issued in at least one previous game to a player; and a processor, communicatively coupled to the display, for determining an outcome of the game, and for taking an action according to the outcome of the game.

15. The apparatus of claim 14, further comprising an input device coupled to the processor, for accepting user input controlling the game.

16. An apparatus for playing a game, comprising:

means for concurrently presenting a playing hand having at least one card and a representation of each card issued in at least one previous game to a player;

means for determining an outcome of the game; and means for taking an action according to the outcome of the game.

17. The apparatus of claim 16, wherein the means for concurrently presenting a playing hand having at least one card and a representation of each card issued in a previous game to the player comprises:

means for chronologically arranging each card issued in a previous game.

18. The apparatus of claim 16, wherein the playing hand comprises a plurality of cards selected from a deck having a plurality of suits, and wherein the means for concurrently presenting a playing hand having at least one card and a representation of each card issued in a previous game to the player comprises:

means for grouping each card issued in the previous game by suit; and means for presenting the grouped cards issued in the previous game to the player.

19. The apparatus of claim 18, wherein the means for concurrently presenting a playing hand having at least one card and a representation of each card issued in a previous game to the player comprises:

means for chronologically arranging each card in each group of cards issued in a previous game.

20. The apparatus of claim 16, wherein the means for concurrently presenting a playing hand having at least one card and a representation of at least one card issued in at least one previous game to the player comprises:

means for concurrently presenting a playing hand having at least one card and a representation of at least one card issued in an immediately preceding game to the player.

21. The apparatus of claim 16, wherein the means for concurrently presenting a playing hand having at least one card and a representation of at least one card issued in at least one previous game to the player further comprises:

means for annotating the representation of each card to indicate the cards in the playing hand.

* * * * *